Jan. 5, 1971 D. H. SMITH 3,552,863
METHOD AND APPARATUS FOR COMPARING THE TRANSMITTANCE
OF A SAMPLE AND A STANDARD
Filed July 28, 1967 2 Sheets-Sheet 1
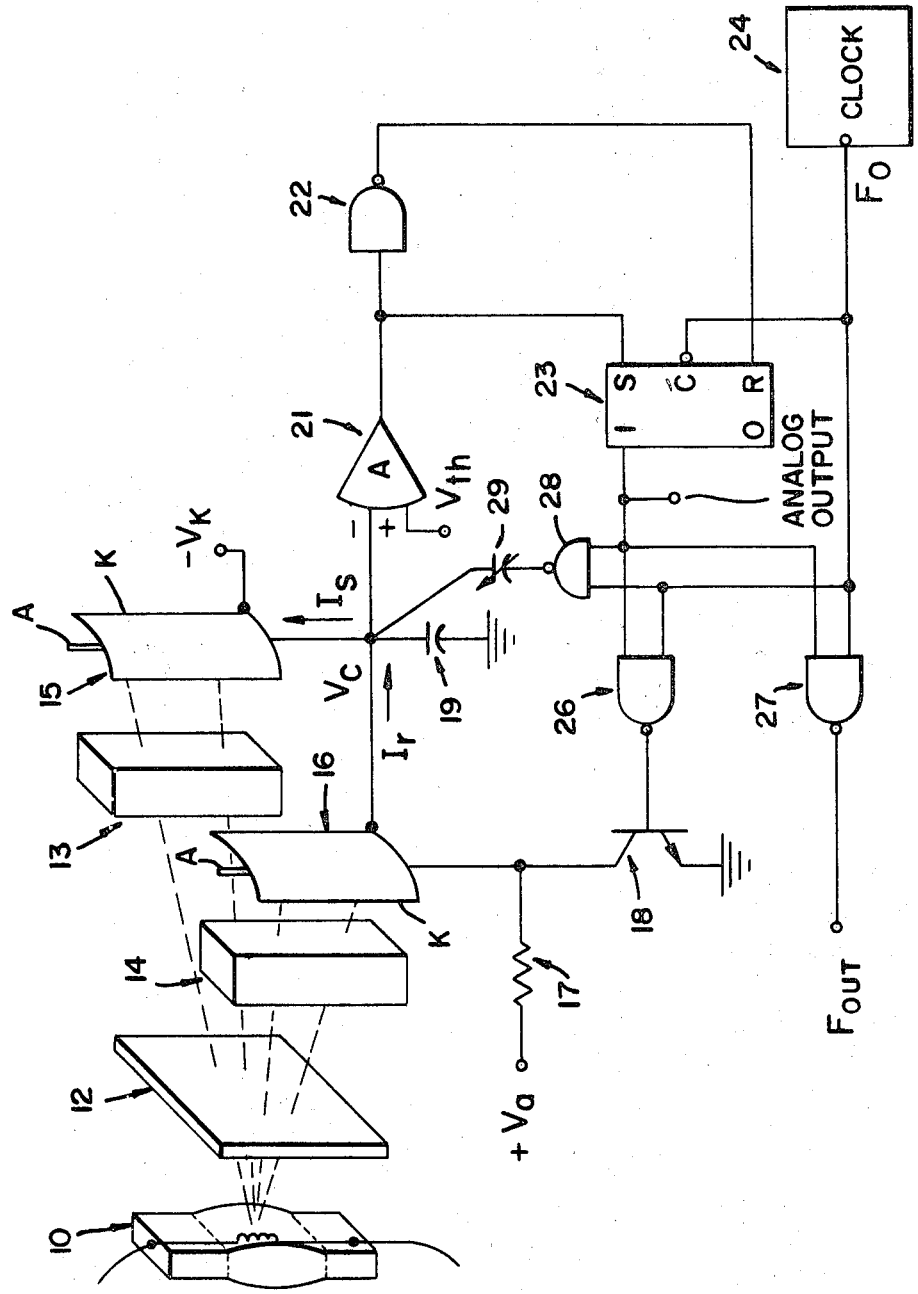
FIG_1
INVENTOR.
DOUGLAS H. SMITH
BY
ATTORNEYS

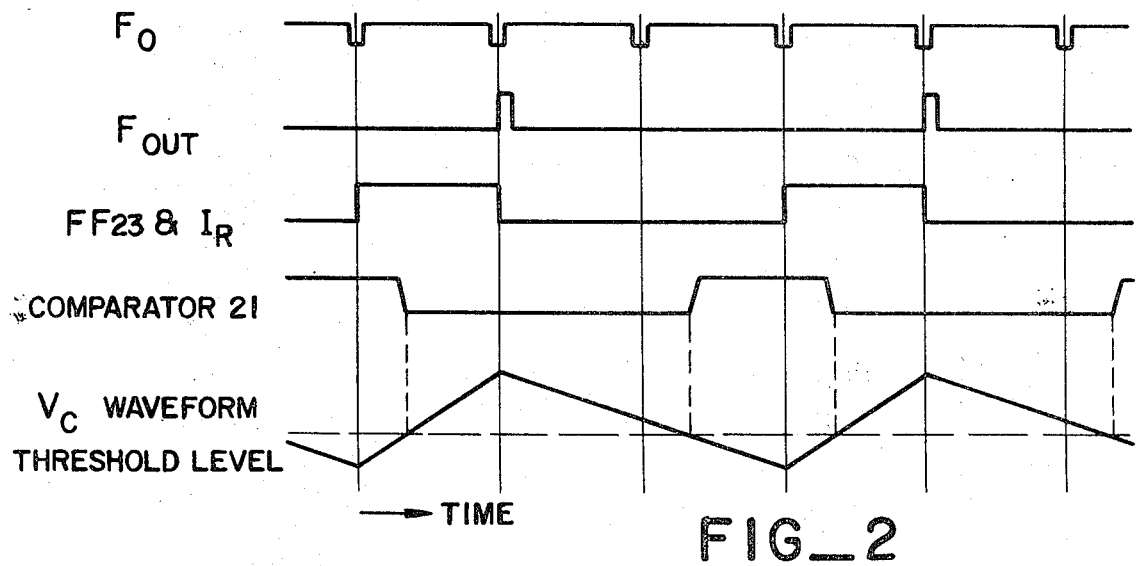
FIG_2
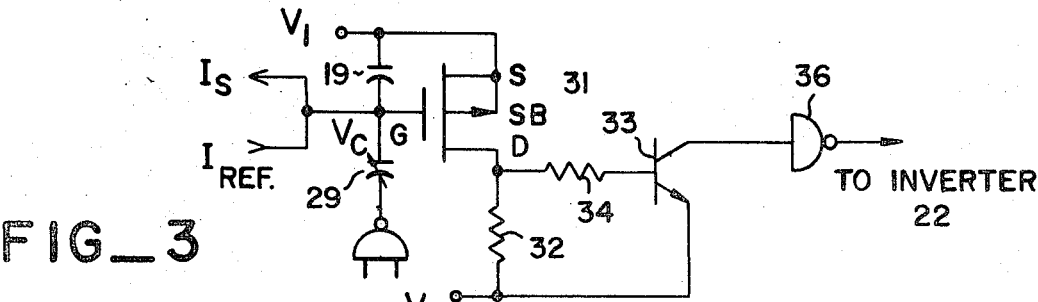
FIG_3
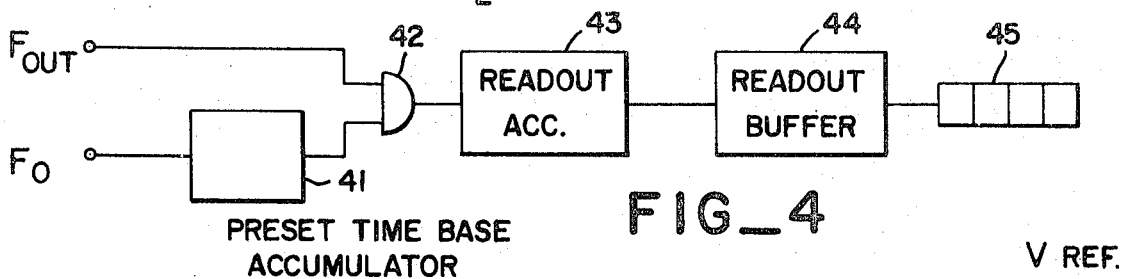
FIG_4
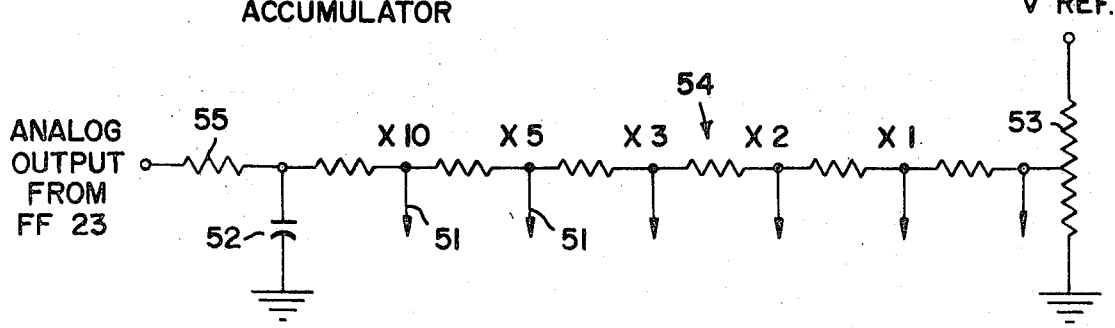
FIG_5

United States Patent Office 3,552,863
Patented Jan. 5, 1971

3,552,863
METHOD AND APPARATUS FOR COMPARING THE TRANSMITTANCE OF A SAMPLE AND A STANDARD
Douglas H. Smith, San Carlos, Calif., assignor to Beckman Instruments, Inc., a corporation of California
Filed July 28, 1967, Ser. No. 656,819
Int. Cl. G01n 21/22
U.S. Cl. 356—206
23 Claims

ABSTRACT OF THE DISCLOSURE

A transmittance to frequency converter where a common light source illuminates a sample cuvette and a reference cuvette. The transmitted light is individually measured by two phototubes. The time average output currents of the two phototubes are of opposite polarities and are combined in an integrating capacitor coupled to a comparator. The comparator is part of feedback control loop which provides for control of the time average of the reference current to make it equal to the average sample current. A transistor switch controls the "on" time of the reference phototube to thereby control of the time average of the reference current. The duty cycle of the switch is proportional to the transmittance of the sample.

---

The present invention is directed in general to a transmittance to frequency converter and method therefor and more specifically a digital absorption photometer.

In the measurement of the transmittance of liquids in the fields of liquid chromatography, absorption photometry or colorimetry, for example, accuracy of the output data is a much desired characteristic. The accuracy problem is aggravated by the fact that existing devices have analog outputs. With increasing emphasis being placed on automation and computer data reduction, it has been necessary to add auxiliary equipment to convert the analog outputs to digital form. Besides adding cost, the accuracy of the system is decreased while the complexity is increased.

Present causes of low accuracy in transmittance measurement devices include poor warm-up and drift characteristics, low level signal voltages in relatively high noise level environments, and variation in intensity of the system light source.

It is a general object of the present invention to provide a transmittance to frequency converter and method therefor.

It is another object of the invention to provide a converter of the above type having high accuracy and resolution.

It is another object of the invention to provide a converter having a digital output.

It is another object of the invention to provide a transmittance to frequency converter which is simple in design and inexpensive in construction.

It is another object of the invention to provide a converter which minimizes the effects of both light source instability and analog to digital conversion on the accuracy of the device.

In accordance with the above objects there is provided a transmittance to frequency converter for comparing the transmittance of a sample to a reference standard. This is accomplished by illuminating the sample and reference standard from a common light source and individually sensing the light transmitted through the sample and reference standard. The converter comprises photometer means which senses the transmitted light and produces a sample current having an instantaneous magnitude related to the transmittance of the sample and a reference current having an instantaneous magnitude related to the transmittance of the reference standard. Means coupled to the photometer means compare the time average magnitudes of the reference and sample currents and provide first and second indications when the reference current is greater or less than the sample current. Switching means coupled to the photometer means and to the comparing means are responsive to these first and second indications for varying the time average magnitude of the reference standard current. The duty cycle of the switching means is proportional to the transmittance of the sample.

From another aspect the invention comprises a method of converting the transmittance of a sample to a frequency by comparing the sample transmittance to the transmittance of a reference standard. The method includes steps of, providing a source of light for illuminating the sample and reference standard, and individually sensing the amount of light transmitted through the sample and reference standard and representing such amounts by respective reference and sample currents. The instantaneous magnitudes of the currents indicate transmittance.

The time average values of the reference and sample currents are compared to cause the average reference current to substantially equal the sample current by regulating the time average value of the reference current.

The regulation of the reference current is sensed to produce a signal having a frequency related to the transmittance of the sample.

The invention as set forth in the specification will become more clearly apparent from the following description.

Referring to the drawings:

FIG. 1 is a perspective view and schematic of associated circuitry of a transmittance to frequency converter embodying the present invention;

FIG. 2 is a timing diagram showing various wave forms present in the circuit of FIG. 1;

FIG. 3 is a detailed circuit schematic of a portion of FIG. 1;

FIG. 4 is a block diagram illustrating how the present invention provides a digital readout; and FIG. 5 is a circuit schematic showing an auxiliary circuit for use in conjunction with an analog type recording device.

Referring first to FIG. 1, a light source 10 illuminates a sample cuvette 13 and a reference cuvette 14. Intermediate to cuvettes 13, 14 and source 10 is a filter 12 which provides light within a given band of frequencies. The cuvettes themselves, depending on the specific system in which the cuvettes are incorporated, may contain either a quiescent fluid or a continuously flowing fluid sample. In some applications the reference cuvette may merely contain air.

The light from source 10 which is transmitted through cuvettes 13 and 14 is sensed by a pair of photo detector devices 15 and 16 which are respectively associated with cuvettes 13 and 14. The schematic representation indicates phototubes; however, other light responsive devices such as solid state diodes may also be used. Each phototube includes an anode "A" and a cathode "K." The cathode 15K is coupled to a negative source of voltage, $-V_K$, and the anode 16A to a positive source of voltage, $+V_A$, through a series connected resistor 17. Anode 16A is also clamped to ground through a transistor reference switch 18. Thus, during on conditions of transistor switch 18 the phototube 16 is reverse biased and no reference current can be produced.

Phototubes 15 and 16 provide output currents related to the instantaneous intensity of the light transmitted through cuvettes 13 and 14 respectively. More specifically output current, $I_S$, of phototube 15 has a polarity indicated by its direction of flow toward anode 15A. Similarly the reference current, $I_R$, from phototube 16 has a polarity in the direction away from cathode 16K. Anode 15A and cathode 16K are joined at a common point designated $V_c$ which is grounded through an integrating capacitor 19. The potential at $V_c$ varies in accordance with the average difference between the currents $I_R$ and $I_S$ as will be explained below.

A comparator amplifier 21 is coupled to common point $V_c$ and is responsive to voltages at this point for producing an output when this voltage is above a predetermined threshold, $V_{th}$. $V_{th}$ is indicated as an input to amplifier 21. When the $V_c$ voltage falls below this predetermined threshold an output is produced (see FIG. 2).

Coupled to the output of amplifier 21 is an inverter 22. A flip-flop type logic element 23 includes input terminals set, S, reset, R, and a switching input (C). As outputs the flip-flop has true and false levels designated "1" and "0."

In operation flip-flop 23 functions in a typical manner where the stable state of the flip-flop is shifted only in response to the coincidence of an enabling of the set or reset terminals along with a trigger pulse to the trigger input C.

Set terminal S is coupled to the output of amplifier 21 and reset terminal R to the output of inverter 22. Trigger input C is coupled to a clock-pulse generator 24 generating pulses at a frequency $F_0$ as indicated by the timing diagram of FIG. 2. The "1" level output of flip-flop 23 is coupled to the base input of transistor 18 through NAND gate 26. The other input of gate 26 is from clock 24. The two inputs to gate 26 are also parallel coupled to a pulse coupled NAND gate 27 providing an output designated $F_{out}$ (FIG. 2) and a NAND gate 28 having its output coupled through a variable capacitor 29 to point $V_c$.

OPERATION

The output current, $I_S$, of phototube 15 is proportional to the transmittance of sample 13 in accordance with the following equation:

$$I_S \alpha E_S \times T_f \times T_S \quad (1)$$

where $E_S$ is the intensity of source 10, $T_f$ is the transmittance of filter 12 and $T_S$ the sample transmittance. Similarly the current $I_R$ from phototube 16 is proportional to the transmittance of reference standard cuvette 14 as determined by:

$$I_R \alpha E_S \times T_f \times T_R \quad (2)$$

where $T_R$ is the reference transmittance. Equations 1 and 2 relate to instantaneous values of current.

Because of the opposite polarities of $I_S$ and $I_R$, capacitor 19 serves as an integrator to reflect any difference between the time average magnitudes. This is shown as a variation in $V_c$ (FIG. 2). A feedback control system which attempts to maintain $V_c$ at $V_{th}$ includes amplifier 21, flip-flop 23 and reference switch 18. By control of switch 18 the output of current $I_R$ from phototube 16 can be initiated or discontinued at will to thereby regulate the time average magnitude of $I_R$. Thus, the voltage $V_c$ is maintained near the threshold potential, $V_{th}$, of the feedback system since the feedback system maintains the following equality:

$$I_S(\text{average}) = I_R(\text{average}) \quad (3)$$

Thus, by relating $F_{out}$, the actual switching rate of switch 18 to $F_0$, which determines the operating cycle of the control system, a duty cycle value is obtained.

Assuming a balanced optical system which means that the proportionality factors in Equation 1 and 2 are equal, the two equations may be combined:

$$\frac{I_S}{I_R} = \frac{T_S}{T_R} \quad (4)$$

However in Equation 4 the above values of current are instantaneous. But over a short period of time since the flow of $I_S$ is not interrupted the following holds:

$$I_S(\text{average}) = I_S(\text{instantaneous}) \quad (5)$$

In the case of $I_R$, the duty cycle of switch 18 relates the average current to the instantaneous current value. The duty cycle, as will be explained in greater detail below, is equivalent to the ratio, $F_{out}/F_0$, $F_0$ is the clock pulse frequency of generator 24. $F_{out}$ is an output frequency related to the switching cycle of switch 18, and flip-flop 23. Thus, by relating $F_{out}$, the actual switching rate of switch 18 to $F_0$, which determines the operating cycle of the control system, a duty cycle value is obtained. Thus, $$I_R (\text{average}) = \frac{F_{out}}{F_0} \times I_R (\text{instantaneous}) \quad (6)$$

Substituting Equations 3, 4 and 5 in Equation 6 yields, $$\frac{T_S}{T_R} = \frac{F_{out}}{F_0} \quad (7)$$

Note that from Equation 7 the sample transmittance is related to a frequency ratio which is independent of source intensity $E_S$, the threshold level of comparator amplifier 21, and the value of the integrating capacitor 19. Also any shift in the clocking frequency, $F_0$, causes a similar shift in $F_{out}$ thereby again providing for independence of sample transmittance from clocking frequency, $F_0$.

Referring now to the more specific circuit operation of the device, current, $I_S$, from sample phototube 15 causes integrating capacitor 19 to charge in the negative direction. Transistor switch 18 is normally closed to reverse bias reference phototube 16 and prevents production of $I_R$. When the potential across capacitor passes through the threshold level, $V_{th}$, (see the waveforms of FIG. 2) comparator amplifier 21 produces an output voltage. This enables set gate S of flip-flop 23. At the next clock pulse from source 24 to trigger gate C, flip-flop 23 is set. The setting of flip-flop 23 enables one input to NAND gate 26.

NAND gate 26 has, as a second coincidence input, clock pulses $F_0$ which have a polarity relative to the gate to disable the gate only during the pulse spikes and to enable it with a coincidence input from the "1" level of flip-flop 23 during all other times. Thus, in effect the $F_0$ clock frequency momentarily switches off the phototube 16 for the duration of every clock pulse spike. This is done for the purpose of compensating for the finite rise and fall times of phototube 16 and in effect providing identical pulse areas for each clock period of operation.

The enabling of NAND gate 26 by its two inputs opens switch 18 and allows $I_R$ to be produced. Upon the enabling of $I_R$ or coupling of $I_R$ to capacitor 19 the voltage $V_c$ begins to rise. As shown in FIG. 2, when $V_c$ rises above the threshold level, $V_{th}$, comparator 21 switches to its off condition. This indication of comparator 21 enables reset terminal R of flip-flop 23. On the next clock pulse, $F_0$, the flip-flop output is switched to "0" removing the coincidence voltage on NAND gate 26 and closing switch 18. This prevents the reference current, $I_R$, from being produced and in effect decouples it from the comparator 21 and its associated capacitor 19.

Thus, it is apparent that each time switch 18 is opened by activiation of the "1" output of flip-flop 23 that this also provides a coincidence input to NAND gate 27. The other input is clock pulses $F_0$ and when these two inputs coincide an output voltage pulse of frequency $F_{out}$ is produced (FIG. 2). Moreover the $F_{out}$ pulses are equal in frequency to the production of $I_R$ pulses and the change in state of flip-flop 23 as shown in FIG. 2. No $F_{out}$ pulse is produced at the initial charge in state of flip-flop 23 because of the time delay of the flip-flop with reference to the $F_0$ pulses.

But, more importantly, as shown by Equation 6, the switching rate or duty cycle of switch 18 is representative of the ratio of magnitudes between the instantaneous $I_R$ and the average $I_R$ which is necessary to make the average $I_R$ equal to the average $I_S$ (Equation 3). And as shown by Equation 7 this duty cycle is the key factor in solving for the sample transmittance. FIG. 2 illustrates a 30% cycle which also means that the transmittance of sample 13 is 30% of reference standard 14.

To compensate for any interelectrode capacitance in the reference phototube 16 capacitor 29 is provided which functions only during transition periods of switch 18. This is adjusted in value to compensate for any capacitance present in a specific phototube. Its value is relatively small so that the overall effect on the integrating capacitor 19 is minimal.

The detailed circuitry of comparator amplifier 21 is illustrated in FIG. 3 and includes an insulated gate field effect (IGFET) transistor 31 having its gate coupled to integrating capacitor 19 at the voltage node $V_c$ and also the $I_S$ and $I_R$ current lines from phototubes 15 and 16. The source terminal of transistor 31 is coupled to a reference potential $V_1$ and the drain terminal to a reference potential $V_2$ through a resistor 32. In addition the drain terminal is coupled to the base of output transistor 33 through a series resistor 34. The collector output of transistor 33 is then coupled to inverter 22 (FIG. 1) through a voltage amplification state 36.

By use of an IGFET type transistor, the gate terminal is effectively insulated from the remainder of the circuit. This isolation again enhances the accuracy of the system by preventing any unwanted leakages and loads on the reference and sample currents $I_R$ and $I_S$.

FIG. 4 illustrates the additional equipment necessary to transform a frequency output, $F_{out}$, into an actual digital readout. To accomplish this a ratio frequency counter is utilized which has as inputs $F_{out}$ and $F_o$. The $F_o$ pulses are coupled to a preset time base accumulator 41 having an output which is one input of NAND gate 42; the other input is $F_{out}$.

The output of NAND gate 42 is coupled to readout accumulator 43 where the frequency output pulses are accumulated. Gate 42 remains enabled for a preset number of clock pulses after which the readout buffer 44 is updated and both accumulators are reset to start a new reading period. Block 45 indicates the actual digital readout device. This device may be merely a visual readout device or printer or alternatively a magnetic tape device.

An analog output capability is also available from the present invention as illustrated in FIG. 5 where the "1" level output from flip-flop 23 of FIG. 1 is coupled into a voltage divider circuit. Since the duty cycle of the flip-flop is directly proportional to the transmittance of the sample, the converted analog form of this duty cycle information may be used to drive recorders from the various taps 51 as illustrated. Capacitor 52 and input resistor 55 act as a filter to convert the duty cycle waveform to a D.C. voltage proportional to the duty cycle and hence proportional to the sample transmittance. By proper choice of resistance in the voltage divider different resolutions, as indicated, are available.

The optical system shown in the embodiment of FIG. 1 is merely representative of several variations in the system which are available. For example, where a very high accuracy is desired lenses would be used to focus the light source on the phototubes. Furthermore in order to ensure that both phototubes "see" light from the same angle from the source a half silvered mirror may be used to divide the light between the two phototubes. With this system the highest degree of accuracy is achieved.

Where noise requirements are not as critical, the lenses may be eliminated and the phototubes oriented in any convenient manner so that they do not necessarily see the same light paths from the source. Other optical systems available are parallel light systems where a spherical mirror focuses the light from the light source and reflects it back through the filter, cuvettes, and phototubes. A two mirror dual image system may be used where the light source is focused on two separate mirrors; this has the advantage of collecting a large amount of light.

Thus, the present invention provides for direct digital conversion where the accuracy of conversion is dependent essentially upon the optics of the system and on the phototubes. The system is low in cost since only one low quality amplifier is required and the light source may be unregulated. Low noise is inherent in the system since the time averaging of the reference and sample currents provides for a nearly infinite normal mode rejection. The converter device has direct compatibility with a digital data reduction systems.

I claim:
1. A transmittance to frequency converter for comparing the transmittance of a sample to a reference standard by illuminating the sample and reference standard from a common light source and individually sensing the light transmitted through said sample and reference standard, comprising;
   photometer means for sensing the transmitted light and producing a sample current having a magnitude related to the transmittance of the sample and a reference current having a magnitude related to the transmittance of the reference standard;
   means coupled to the photometer means for comparing the time average magnitudes of the reference and sample currents and for providing first and second indications where the average reference current is greater and less than the average sample current respectively; and
   switching means coupled to the photometer means and the comparing means for decoupling and coupling the reference current to the comparing means when the first and second indications are present, respectively, the duty cycle of the switching means being proportional to the transmittance of the sample.

2. A transmittance to frequency converter as in claim 1 where said coupling and decoupling occurs at points in time coincident with a periodic function.

3. A transmittance to frequency converter as in claim 2 where said periodic function is a factor in the proportionality of said sample transmittance to said duty cycle.

4. A transmittance to frequency converter as in claim 2 together with a clock pulse generator to provide said periodic function.

5. A transmittance to frequency converter as in claim 1 where said photometer means includes first and second photometer means respectively associated with said sample and reference currents for sensing light transmitted through said sample and reference standard respectively.

6. A transmittance to frequency converter as in claim 1 where said comparing means includes an integrating capacitor.

7. A transmittance to frequency converter as in claim 6 where said comparing means includes a comparator amplifier coupled to said capacitor said amplifier having a threshold level and being responsive to variations in the magnitude of voltage across said capacitor above and below said threshold level to selectively produce an output voltage.

8. A transmittance to frequency converter as in claim 7 where said output voltage is one of said indications and lack of an output voltage is the other of said indications.

9. A transmittance to frequency converter as in claim 1 where said instantaneous value of said sample current is equal to said time average value of said sample current.

10. A transmittance to frequency converter as in claim 4 where said switching means is responsive to the coincidence of a clock pulse and said first and second indications for coupling and decoupling said reference current to and from said comparing means whereby said reference current is coupled for a predetermined time which is equal to the period between timing pulses or a multiple thereof, and whereby the period between said reference current coupling periods represents a frequency proportional to the transmittance of said sample.

11. A method of converting the transmittance of a sample to a frequency by comparing the sample transmittance to the transmittance of a reference standard comprising the steps of:
   providing a source of light for illuminating said sample and reference standard;
   individually sensing the amount of light transmitted through said sample and reference standard and representing such amounts by respective reference and sample currents where the magnitudes of the currents indicate respective transmittances;
   continuously integrating said sample current over a first interval of time to obtain a first time average value of current;
   continuously integrating the arithmetic combination of said sample and reference currents over a second interval of time to obtain a second time average value of current;
   comparing said first and second time average values of current to selectively vary the second interval of time such that the magnitude of the second time average value of current is substantially equal to the magnitude of the first time average value of current; and
   sensing each occurrence of said second interval of time to produce a signal having a frequency related to the transmittance of said sample.

12. A method as in claim 11 where such switching is related to a periodic function.

13. An apparatus for providing a digital output signal representative of the ratio between the magnitudes of a first signal and a second signal having a polarity opposite to that of said first signal comprising:
   comparing means responsive to said first and second signals and for producing first and second signal output levels when said first signal average magnitude is greater and less than said second signal average magnitude, respectively, said first signal being continuously applied to said comparing means;
   a flip-flop coupled to said comparing means and responsive to said first and second signal output levels, respectively, to set said flip-flop to a first state and reset said flip-flop to a second state, said flip-flop remaining in said first state until reset to its second state by said second signal output level from said comparator;
   switching means connected to said flip-flop for continuously coupling said second signal to said comparing means when said flip-flop resides in its first state and for decoupling said second signal from said comparing means when said flip-flop resides in its second state;
   a source of periodic pulses; and,
   gating means connected to said periodic pulse source and to said flip-flop for transmitting pulses through said gating means only when said flip-flop resides in its first state.

14. An apparatus for providing a digital output signal representative of the ratio between the magnitudes of a first signal and a second signal having a polarity opposite to that of the first signal comprising:
   comparing means coupled to said first and second signal for comparing the time average magnitudes of said first and second signals and for providing first and second signal output levels, respectively, when said first signal average magnitude is greater and less than said second signal average magnitude;
   means for continuously applying said first signal to said comparing means, and
   switching means connected to said comparing means for continuously applying said second signal to said comparing means in response to the first signal output level and for decoupling said second signal from said comparing means in response to said second output signal level whereby the duty cycle of said switching means is proportional to the ratio between the magnitudes of said first and second signals.

15. An apparatus as defined in claim 14 comprising in addition,
   a source of periodic pulses; and,
   gating means connected to said periodic pulse source and to said comparing means for transmitting pulses only in response to said first signal level output from said comparing means, the number of transmitted pulses over a selected period of time representing the ratio of the magnitudes of said first and second signals.

16. An apparatus for providing digital output signals representative the ratio between the magnitudes of an input signal and a reference signal having a polarity opposite to that of said input signal comprising:
   an integrating means continuously coupled to said injut signal and selectively coupled to said reference signal for providing an output signal equal to the algebraic sum of said input and reference signals over a period of time;
   a threshold detector connected to said integrating means for producing a first signal output level when the output signal from the integrating means crosses a selected threshold level in a first direction and for providing a second output signal when the output signal from said integrating means crosses said selected threshold level in a second direction;
   switching means connected to said threshold detector for continuously applying said reference signal to said integrating means so long as said threshold detector provides a first signal output level and for disconnecting said reference signal from said integrating means when said threshold detector provides a second signal level;
   a source of clock pulses; and,
   gating means connected to said periodic pulse source and to said threshold detector for transmitting pulses only when said threshold detector provides a first signal output level, the average frequency of said transmitted pulses being proportional to the ratio of the magnitudes of said input signal and said reference signal.

17. An apparatus as claimed in claim 16 comprising in addition a flip-flop connected between said threshold detector and said switching means, said flip-flop being set in its first state in response to the first signal output level from said threshold detector and reset to its second state in response to the second signal output level from said threshold detector.

18. An apparatus as defined in claim 16 wherein the magnitude of said reference signal varies over a period of time.

19. An apparatus as defined in claim 16 comprising in addition means for coupling said periodic pulse source to said flip-flop whereby said flip-flop is set and reset in response to pulses from said clock source to synchronize the switching of the flip-flop with said clock pulse source.

20. In a photometer including means for providing a sample signal whose magnitude varies as a function of the transmittance of the sample being monitored and means for providing a reference signal whose magnitude is proportional to a reference standard, both said sample and reference signals varying in magnitude over a period of time, the improvement comprising:
   an integrating circuit;
   means for continuously applying said sample signal to said integrating circuit;
   switching means connected to said integrating circuit for selectively applying said reference signal to said integrating circuit;
   said integrating circuit providing an output signal varying in one polarity direction when only said sample signal is coupled thereto and providing an output signal varying in a second polarity direction when both the sample and reference signals are coupled thereto;

a threshold detector connected to said integrating circuit for sensing the output thereof and providing a first signal output level when the output of said integrating circuit passes through a selected threshold level in a first polarity direction and a second signal output level when said integrating circuit output passes through said selected threshold level in a second polarity direction;

a flip-flop coupled to said threshold circuit and responsive to said first and second signal output levels, respectively, to said flip-flop in a first state and reset said flip-flop to a second state;

means for connecting the output of said flip-flop said switching means whereby said switching means continuously couples said reference signal to said integrating circuit when said flip-flop resides in its first state and decouples said reference signal from said integrating circuit when said flip-flop resides in its second state;

a source of periodic pulses; and, gating means connected to said periodic pulse source and to said flip-flop for transmitting pulses only when said flip-flop resides in its first state, the average frequency of the transmitted pulses being proportional to the ratio of the magnitudes of said sample and reference signal.

21. An apparatus as defined in claim 20 comprising in addition means for connecting said clock pulse source to said flip-flop whereby said flip-flop is set and reset by clock pulses to synchronize the operation of the flip-flop with said clock pulse source.

22. An apparatus as defined in claim 21 wherein said integrating circuit comprises a capacitor.

23. An apparatus as defined in claim 22 comprising in addition a second gating means connected to the output of said flip-flop and the input of said switching means and means for connecting said clock pulse source to said second gating means to synchronize said second gating means with said clock pulse source.

References Cited

UNITED STATES PATENTS 2,897,445  7/1959  Goodale _____ 324—111

FOREIGN PATENTS 950,647  2/1964  Great Britain.

RONALD L. WIBERT, Primary Examiner

O. B. CHEW II, Assistant Examiner

U.S. Cl. X.R.

250—214, 218, 220; 324—140

PO-1050
(5/69)

UNITED STATES PATENT OFFICE
CERTIFICATE OF CORRECTION

Patent No. 3,552,863      Dated January 5, 1971

Inventor(s) Douglas H. Smith

It is certified that error appears in the above-identified patent and that said Letters Patent are hereby corrected as shown below:

Claim 19, line 1, "16" -- change to read -- 17 --.

Signed and sealed this 1st day of June 1971.

(SEAL)
Attest:

EDWARD M. FLETCHER, JR.      WILLIAM E. SCHUYLER, JR.
Attesting Officer      Commissioner of Patents

Dedication 3,552,863.—*Douglas H. Smith*, San Carlos, Calif. METHOD AND APPARATUS FOR COMPARING THE TRANSMITTANCE OF A SAMPLE AND A STANDARD. Patent dated Jan. 5, 1971. Dedication filed Aug. 23, 1971, by the assignee, *Beckman Instruments, Inc.*
Hereby dedicates to the Public the remaining term of said patent.
[*Official Gazette October 19, 1971.*]